(12) United States Patent
Learned

(10) Patent No.: US 11,690,090 B2
(45) Date of Patent: Jun. 27, 2023

(54) MITIGATION OF COMMUNICATION SIGNAL INTERFERENCE USING ADAPTIVE TRANSMIT POWER

(71) Applicant: Massachusetts Institute of Technology, Cambridge, MA (US)

(72) Inventor: Rachel E. Learned, Waltham, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 398 days.

(21) Appl. No.: 16/880,410

(22) Filed: May 21, 2020

(65) Prior Publication Data

US 2023/0163829 A1    May 25, 2023

Related U.S. Application Data

(60) Provisional application No. 62/850,730, filed on May 21, 2019.

(51) Int. Cl.
| | | |
|---|---|---|
| *H04L 1/00* | (2006.01) | |
| *H04B 1/7103* | (2011.01) | |
| *H04W 72/541* | (2023.01) | |
| *H04B 7/08* | (2006.01) | |
| *H04L 25/02* | (2006.01) | |

(Continued)

(52) U.S. Cl.
CPC .......... *H04B 7/086* (2013.01); *H04B 1/7103* (2013.01); *H04L 1/0048* (2013.01); *H04L 25/0204* (2013.01); *H04W 52/241* (2013.01); *H04W 52/367* (2013.01); *H04W 72/541* (2023.01)

(58) Field of Classification Search
CPC ..... H04B 7/086; H04B 1/7103; H04L 1/0048; H04L 25/0204; H04W 72/082
See application file for complete search history.

(56) References Cited

U.S. PATENT DOCUMENTS

| | | |
|---|---|---|
| 6,018,317 A | 1/2000 | Dogan et al. |
| 6,487,414 B1 | 11/2002 | Tanay et al. |

(Continued)

FOREIGN PATENT DOCUMENTS

| | | |
|---|---|---|
| WO | WO 2010/066289 A1 | 6/2010 |
| WO | WO 2011/006116 A1 | 1/2011 |

(Continued)

OTHER PUBLICATIONS

Non-Final Office Action dated Feb. 9, 2022 for U.S. Appl. No. 16/880,377; 13 Pages.

(Continued)

*Primary Examiner* — Janice N Tieu
(74) *Attorney, Agent, or Firm* — Daly, Crowley, Mofford & Durkee, LLP

(57) ABSTRACT

In some embodiments, a method for mitigating interference in a channel having multiple users includes: transmitting, by a transmitter, a signal of interest (SOI) to a sequential interference cancellation (SIC) receiver at a transmit power; determining a packet drop rate as seen by the receiver; and decreasing the transmit power in response to determining the packet drop rate exceeds a predetermined maximum packet drop rate. The transmitter's coding rate and/or modulation level may also be lowered based on the decrease in transmit power.

22 Claims, 8 Drawing Sheets

(51) Int. Cl.
*H04W 52/24* (2009.01)
*H04W 52/36* (2009.01)

(56) References Cited

U.S. PATENT DOCUMENTS

| | | | |
|---|---|---|---|
| 6,701,129 B1* | 3/2004 | Hashem | H04L 1/0025 455/67.11 |
| 6,704,376 B2 | 3/2004 | Mills et al. | |
| 6,947,505 B2 | 9/2005 | Learned | |
| 7,031,266 B1 | 4/2006 | Patel et al. | |
| 7,058,422 B2 | 6/2006 | Learned et al. | |
| 7,085,575 B2 | 8/2006 | Fabien et al. | |
| 7,092,452 B2 | 8/2006 | Taylor et al. | |
| 7,126,533 B2 | 10/2006 | Fiore et al. | |
| 7,126,890 B2 | 10/2006 | Learned et al. | |
| 7,190,743 B2 | 3/2007 | Learned | |
| 7,218,690 B2 | 5/2007 | Learned | |
| 7,269,223 B2 | 9/2007 | Learned et al. | |
| 7,558,238 B1 | 7/2009 | Sun et al. | |
| 7,593,473 B2 | 9/2009 | Learned et al. | |
| 7,593,492 B1 | 9/2009 | Lande et al. | |
| 7,724,851 B2 | 5/2010 | Learned et al. | |
| 7,738,906 B2 | 6/2010 | Attar et al. | |
| 9,148,804 B2 | 9/2015 | Learned | |
| 9,913,229 B2* | 3/2018 | Tinnakornsrisuphap | H04W 52/325 |
| 9,998,199 B2 | 6/2018 | Learned et al. | |
| 10,091,798 B2 | 10/2018 | Learned et al. | |
| 10,225,112 B1 | 3/2019 | Doane | |
| 11,005,507 B2 | 5/2021 | Dowling | |
| 11,194,005 B2 | 12/2021 | Reisenfeld et al. | |
| 2001/0028675 A1 | 10/2001 | Bierly et al. | |
| 2002/0002052 A1 | 1/2002 | McHenry | |
| 2002/0122413 A1 | 9/2002 | Shoemake | |
| 2002/0181637 A1* | 12/2002 | Nakabayashi | H04L 1/0034 375/372 |
| 2003/0043071 A1 | 3/2003 | Lilly et al. | |
| 2004/0018843 A1 | 1/2004 | Cerwall et al. | |
| 2004/0082363 A1 | 4/2004 | Hosein | |
| 2004/0235472 A1 | 11/2004 | Fujishima et al. | |
| 2005/0124347 A1 | 6/2005 | Hosein | |
| 2005/0201280 A1 | 9/2005 | Lundby et al. | |
| 2007/0086379 A1 | 4/2007 | Takayanagi et al. | |
| 2008/0089279 A1 | 4/2008 | Hu et al. | |
| 2008/0198828 A1 | 8/2008 | Reznik et al. | |
| 2008/0293353 A1 | 11/2008 | Mody et al. | |
| 2009/0154534 A1 | 6/2009 | Hassan | |
| 2009/0190566 A1 | 7/2009 | Kwon et al. | |
| 2009/0258597 A1 | 10/2009 | Chen et al. | |
| 2010/0124930 A1 | 5/2010 | Andrews et al. | |
| 2010/0142465 A1 | 6/2010 | Medepalli et al. | |
| 2010/0165956 A1 | 7/2010 | Razzell | |
| 2010/0289688 A1 | 11/2010 | Sherman et al. | |
| 2010/0304770 A1 | 12/2010 | Wietfeldt et al. | |
| 2011/0021153 A1 | 1/2011 | Safavi | |
| 2011/0093540 A1 | 4/2011 | Eisenberg et al. | |
| 2011/0176508 A1 | 7/2011 | Altintas et al. | |
| 2011/0286351 A1 | 11/2011 | Reudink | |
| 2012/0039183 A1 | 2/2012 | Barbieri et al. | |
| 2012/0069941 A1 | 3/2012 | Herbig | |
| 2012/0071102 A1 | 3/2012 | Palomar et al. | |
| 2012/0108276 A1 | 5/2012 | Lang et al. | |
| 2012/0208571 A1 | 8/2012 | Park et al. | |
| 2013/0035108 A1 | 2/2013 | Joslyn et al. | |
| 2013/0089021 A1 | 4/2013 | Gaal et al. | |
| 2013/0128762 A1* | 5/2013 | Guo | H04W 52/20 370/254 |
| 2013/0244681 A1 | 9/2013 | Ookubo et al. | |
| 2014/0126488 A1 | 5/2014 | Learned | |
| 2014/0293867 A1 | 10/2014 | Horiuchi et al. | |
| 2014/0314003 A1 | 10/2014 | Zhou et al. | |
| 2014/0348004 A1 | 11/2014 | Ponnuswamy | |
| 2015/0049721 A1 | 2/2015 | Wijting et al. | |
| 2015/0089048 A1* | 3/2015 | Jackson | H04L 43/0888 709/224 |
| 2015/0282176 A1 | 10/2015 | MacLeod et al. | |
| 2015/0282189 A1 | 10/2015 | Learned et al. | |
| 2017/0171772 A1* | 6/2017 | Blosco | H04L 41/0816 |
| 2017/0272960 A1* | 9/2017 | Li | H04L 43/08 |
| 2018/0309502 A1 | 10/2018 | Khandani | |
| 2018/0376281 A1* | 12/2018 | Guo | H04W 64/003 |
| 2019/0075438 A1* | 3/2019 | Kuo | H04W 4/70 |
| 2019/0222296 A1 | 7/2019 | Khandani | |
| 2020/0336168 A1 | 10/2020 | Hormis et al. | |
| 2020/0395686 A1 | 12/2020 | Jamin et al. | |
| 2021/0075710 A1* | 3/2021 | Wu | H04L 43/0835 |
| 2021/0235396 A1* | 7/2021 | Jung | H04W 52/48 |

FOREIGN PATENT DOCUMENTS

| | | |
|---|---|---|
| WO | WO 2011/055319 A1 | 5/2011 |
| WO | WO 2013/185150 A1 | 12/2013 |
| WO | WO 2014/052992 A1 | 4/2014 |
| WO | WO 2016/053406 A1 | 4/2016 |
| WO | WO 2016/053406 A9 | 4/2016 |
| WO | WO 2016/114844 A2 | 7/2016 |

OTHER PUBLICATIONS

Final Office Action dated Jun. 27, 2022 for U.S. Appl. No. 16/880,377; 18 Pages.
Ahmed, et al.; "Entropy Expressions and Their Estimators for Multivariate Distributions;" IEEE Transactions on Information Theory; vol. 35; No. 3; May 1989; 5 pages.
Bahl, et al.; "Optimal Decoding of Linear Codes for Minimizing Symbol Error Rate;" IEEE Transactions on Information Theory; Mar. 1974; 4 pages.
Learned; "Making Optimal Use of the Asymmetric Inference Channel;" IEEE; Signals, Systems and Computers (Asilomar); Nov. 6-9, 2011; 6 pages.
Learned; "Making Optimal Use of the Asymmetric Interference Channel;" Asilomar Conference on Signals, Systems, and Computing; Presentation; Nov. 8, 2011; 63 pages.
Neeser, et al.; "Proper Complex Random Processes with Applications to Information Theory;" IEEE Transactions on Information Theory; vol. 39; No. 4; Jul. 1993; 10 pages.
Pham; "Fast Algorithms for Mutual Information Based Independent Component Analysis;" IEEE Transactions on Signal Processing; vol. 52; No. 10; Oct. 2004; 11 pages.
Tufts; "Design Problems in Pulse Transmission;" Technical Report 368; Massachusetts Institute of Technology; Jul. 28, 1960; 52 pages.
Tufts; "Nyquist's Problem—The Joint Optimization of Transmitter and Receiver in Pulse Amplitude Modulation;" Proceedings of the IEEE: vol. 53; Issue 3; 12 pages.
Ungerboeck; "Channel Coding with Multilevel/Phase Signals;" IEEE Transactions on Information Theory; vol. IT-28; No. 1; Jan. 1982; 13 pages.
Verdu; "The Capacity Region of the Symbol-Asynchronous Gaussian Multiple-Access Chanel;" IEEE Transactions on Information Theory; vol. 35; No. 4; Jul. 1989; 19 pages.
U.S. Appl. No. 16/900,116, filed Jun. 12, 2020, Dowling.
U.S. Appl. No. 16/880,377, filed May 21, 2020, Learned.
U.S. Appl. No. 16/880,370, filed May 21, 2020, Learned.
Notice of Allowance dated Jan. 11, 2021 for U.S. Appl. No. 16/900,116; 15 pages.
Chaouech et al. "Multiuser Detection in Asynchronous Multibeam Communications" International Journal of Wireless and Mobile Networks (IJWMN) vol. 4, No. 1; Feb. 2012; pp. 21-34.
Non-Final Office Action dated Mar. 31, 2022 for U.S. Appl. No. 16/880,370; 12 Pages.
Response filed Jun. 1, 2022 to Non-Final Office Action dated Feb. 9, 2022 for U.S. Appl. No. 16/880,377; 9 Pages.
Response to U.S. Office Action dated Jun. 27, 2022 for U.S. Appl. No. 16/880,377; Response filed Sep. 27, 2022; 8 pages.
U.S. Final Office Action dated Sep. 28, 2022 for U.S. Appl. No. 16/880,370; 16 pages.
Advisory Action with Examiner Interview Summary and AFCP Decision dated Oct. 14, 2022 for U.S. Appl. No. 16/880,377; 5 pages.

(56) References Cited

OTHER PUBLICATIONS

Response to U.S. Office Action dated Sep. 28, 2022 for U.S. Appl. No. 16/880,370; Response filed Dec. 9, 2022; 9 pages.
Request for Consideration Under The After Final Consideration Pilot Program 2.0 for U.S. Appl. No. 16/880,370, filed Dec. 9, 2022; 2 pages.
U.S. Notice of Allowance dated Feb. 16, 2023 for U.S. Appl. No. 16/880,377; 9 pages.
U.S. Notice of Allowance dated Feb. 16, 2023 for U.S. Appl. No. 16/880,370; 12 pages.

* cited by examiner

MITIGATION OF COMMUNICATION SIGNAL INTERFERENCE USING ADAPTIVE TRANSMIT POWER

CROSS-REFERENCE TO RELATED APPLICATIONS

This application claims the benefit under 35 U.S.C. § 119 of provisional patent application No. 62/850,730 filed May 21, 2019, which is hereby incorporated by reference herein in its entirety.

STATEMENT REGARDING FEDERALLY SPONSORED RESEARCH

This invention was made with government support under FA8702-15-D-0001 awarded by the U.S. Air Force. The government has certain rights in the invention.

FIELD

The disclosure pertains generally to wireless communication, and more particularly to cognitive radio systems and techniques for achieving ad hoc wireless communications in the presence of other user interference (sometime referred to herein as "interference multiple access wireless communications").

BACKGROUND

As is known in the art, different wireless networks and/or systems of radios avoid interfering with each other by various options. For example, some systems rely on pre-arrangement or careful assignment of frequency bands, time slots, or signature pulses as is done for cellular systems through frequency reuse maps and TDMA for GSM, OFDMA for LTE, spread spectrum for IS-95, and combinations of these for WCDMA through HSPA commercial cellular standards. Other systems utilize collision avoidance techniques such as those employed for a packet based systems such as 802.11/16/22 (WiFi and WiMax) where collisions are controlled as part of a multiple access medium access control procedure (E.g. carrier sense multiple access). Still other systems utilize techniques for "on the fly" interference assessment and avoidance, such as dynamic spectrum access (DSA). This is done by the system of "secondary user" radios actively sensing the radio spectrum and coordinating to choose an empty band for transmission. Existing systems, however, fail if they are unable to avoid interference.

As the consumer market continues to rise for smart phones and wireless data service, the demand for more and more throughput increases and the radio spectrum becomes more crowded. A new paradigm in wireless communication is emerging where radios can be built to withstand interference to the level where interference is no longer avoided. Interference is allowed, even invited, to allow for more wireless devices to make use of the wireless spectrum. For example, the LTE Advanced standard (to support the HetNet feature) allows, even encourages, interference. If this new feature is enabled, reliable performance would require mobiles to have some kind of interference mitigation in the receivers.

Conventional cognitive networks adapt at a network/routing layer, not the physical layer. Such networks typically learn which network nodes are having trouble sending packets through them and then they start to change how they route the packets. This conventional type of cognitive network does not invite or encourage interference; it simply does the best it can to avoid using links that are hindered by interference. The subject of this disclosure, in contrast, purposely seeks out opportunities to create interference, but to do so in an intelligent way that takes advantage of the situation and device protocols and capabilities at hand along with making use of advanced processing and sensing technology so as to enable high throughputs for its own link as well as the link with which it simultaneously shares the band.

As may be understood from U.S. Pat. No. 10,091,798, to Learned and Kaminski, multiuser detection (MUD) on a channel may be performed using sequential/successive interference cancellation (SIC). A SIC MUD receiver estimates received signal parameters for an interfering signal, such as received amplitude, carrier frequency, phase, and baud timing. The receiver then demodulates the interfering signal, recreates it using the estimated parameters and demodulated symbol weights, and subtracts it from the received signal to reveal the signal of interest (SOI) underneath. This "cleaned up" received signal is then passed to a legacy receiver that works well in the absence of co-channel (same band) interference. U.S. Pat. No. 9,998,199, to Learned and Fiore, describe structures and techniques for use with MUD receivers including SIC MUD receivers. Both U.S. Pat. Nos. 10,091,798 and 9,998,199 are hereby incorporated by reference herein in their entireties.

Many existing solutions to reduce signal interference, including many MUD-based solutions, rely on the use of a spread spectrum technique such as direct-sequence spread spectrum (DSSS).

SUMMARY

It is appreciated herein that existing SIC MUD receivers may perform well when the strength of an interfering signal is significantly higher than that of a SOI. That is, existing SIC receivers generally do not perform as well when the interfering signal strength is similar to that of the SOI, as seen at the receiver. The SIC-favorable difference between the interfering or ("unwanted") signal and the SOI, both unspread time-frequency coincident signals, could range anywhere from −3 dB to 6 dB or even 10 dB (unwanted signal power to SOI power ratio), depending upon the rate of the unwanted interfering signal. The higher the rate of the interfering signal, the larger the SIC-favorable power difference. This is generally true when the interfering signal's rate is such that a 0 dB SINR would make it impossible to demodulate the raw channel bits correctly.

As used herein, the phrases "co-existence cognitive radio" and "cognitive co-existence radio" generally refer to an intelligent wireless communication system that is aware of its surrounding environment (i.e., outside world), senses the RF environment to which it is exposed, computes feature parameters from sensed RF signals, makes decisions based upon calculations involving the RF features along with learned features acquired from gained understanding of the environment's behavior in reaction to emissions from the said cognitive coexistence radio. Further, the cognitive co-existence radio adapts its internal states to sensed variations in the RF signals transmitted by others in the environment and makes corresponding changes in certain operating parameters (e.g., transmit-power, carrier-frequency, and modulation strategy) in real-time to have a desired effect upon the emitting devices and their corresponding links as well as a desired effect upon its own link. Often, such changes are made with two primary objectives in mind: (1) to provide highly reliable communications whenever and wherever needed; and (2) to provide efficient utilization of the radio spectrum. Networks which include such co-existence cognitive radios are referred to herein as cognitive networks.

Disclosed embodiments find use in a wide variety of application areas including, but not limited to wireless communication such as that provided by the 4G (LTE) cellular, 802.11 (WiFi), 802.15.4 ("Internet of Things", or IoT), or 802.16 (WiMax) wireless standard and equipment. Since wireless communications with MIMO (multiple input, multiple output) receiver algorithms may be similar mathematically to multiuser detection (MUD) algorithms, disclosed embodiments may be applied to radios that employ MIMO transmission/reception schemes. Furthermore, disclosed embodiments may be applied to systems and techniques for storage on magnetic media (e.g. since magnetic storage readers "see" adjacent tracks in addition to the tracks they are trying to read). This adjacent track interference is mathematically similar to the interference from a "first user on channel" (FUOC) signal. Further still, disclosed embodiments may be applied to signals propagating on a cable (e.g. since receivers closer to a transmitting hub station receive a stronger signal than receivers farther away from the hub station and thus the closer receivers can "see" embedded interfering signal in the presence of the stronger signal that was actually meant for the receivers that are farther away from the transmitting hub).

While the disclosed subject matter can be used in conjunction with spread spectrum systems, disclosed embodiments allow coexistence without the need for any type of bandwidth-wasting signal spreading, including DSSS.

Disclosed embodiments allow different wireless networks and/or radios to co-exist in the same frequency band at the same time, causing interference with one another (i.e. they will interfere on purpose) without different providers and mobile nodes having to conform to a single waveform or coordination-enabling protocol. The different interfering networks/systems do not require pre-specified coordination/cooperation protocols or means of direct communication with each other to negotiate a satisfactory sharing of the same band.

Disclosed embodiments enable backward compatible operation with radios that do not possess the capabilities of this disclosure, where the older radios would maintain high functionality in the presence of the impeded "spectrum share."

Disclosed embodiments may be used with a system of radios (that may or may not include a controller) that are able to direct radios in the network to adjust transmit powers (e.g., lower the transmit power), error correction code rates (e.g., adjust from a 9/10 rate code to a 1/2 rate code), and/or modulation level or "order" (e.g. adjust from 16 QAM to QPSK).

According to one aspect of the present disclosure, a method for mitigating interference in a channel having multiple users can include: transmitting, by a transmitter, a signal of interest (SOI) to a sequential interference cancellation (SIC) receiver at a transmit power; determining a packet drop rate as seen by the receiver; and decreasing the transmit power in response to determining the packet drop rate is greater than a predetermined maximum packet drop rate.

In some embodiments, the method can include incrementally decreasing the transmit power until the packet drop rate is less than the predetermined maximum packet drop rate. In some embodiments, determining the packet drop rate as seen by the receiver can include estimating, by the transmitter, the packet drop based on acknowledgements (ACKs) of successfully received packets or repeat packet requests sent by the receiver. In some embodiments, decreasing the transmit power can include receiving a control message from the receiver instructing the transmitter to decrease the transmit power. In some embodiments, the method can include decreasing the coding rate and the modulation level based on the decrease in transmit power.

In some embodiments, the method can include: after decreasing the transmit power, re-evaluating the packet drop rate; and in response to determining the re-evaluated packet drop rate is less than the predetermined maximum packet drop rate, increasing the coding rate and the modulation level while keeping the transmit power the same. In some embodiments, the method can include: after decreasing the transmit power, re-evaluating the packet drop rate; and in response to determining the re-evaluated packet drop rate is greater than the predetermined maximum packet drop rate, increasing the transmit power.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the present disclosure, some introductory concepts and terminology are explained. Communicating data from one location to another requires some form of pathway or medium between the two locations. In telecommunications and computer networking, a communication channel, or more simply "a channel," refers to a connection between two locations over a transmission medium. The connection may, for example, be a logical connection and the transmission medium may be, for example, a multiplexed medium such as a radio channel. A channel is used to convey an information signal, for example a digital bit stream, from one or several sources or sending nodes (or more simply sources or transmitters) to one or several destinations or receiving nodes (or more simply destinations or receivers). Regardless of the particular manner or technique used to establish a channel, each channel has a certain capacity for transmitting information, often measured by its frequency bandwidth in Hz or its data rate in bits per second.

Figure 1:
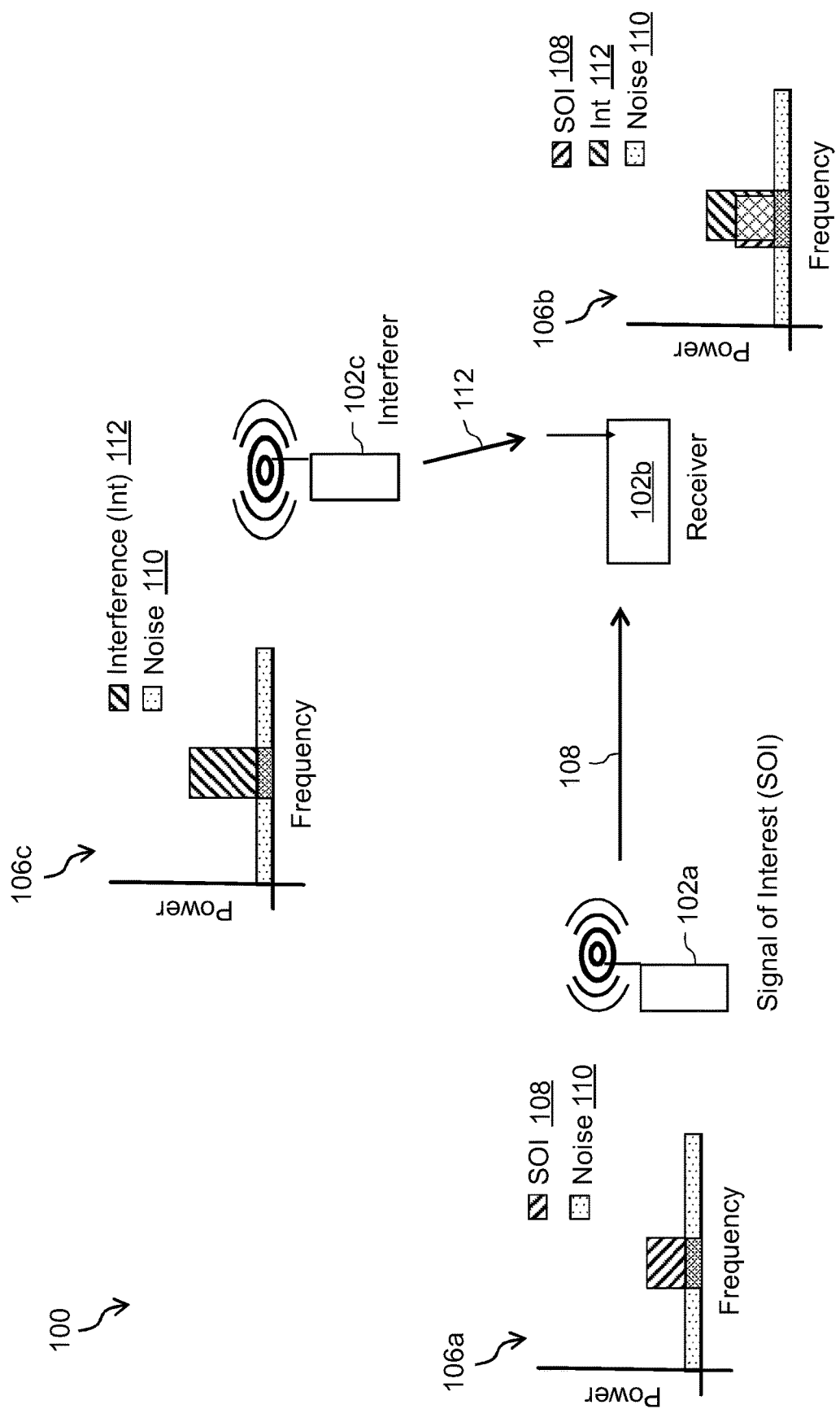
FIG. 1 is a diagram of an illustrative communications environment, or network, in which the disclosed subject matter can be embodied.

Referring to FIG. 1, a communications environment, or network, 100 can include a plurality of radios, or nodes, 102a, 102b, 102c, etc. (102 generally). While only three nodes 102 are shown in FIG. 1 for clarity, the disclosed subject matter can be applied to environments with an arbitrary number of radios.

In the example of FIG. 1, a first radio 102a can transmit a signal of interest (SOI) 108 to a second radio, or receiver, 102b. If there were no other users in the channel, the receiver 102b would see the SOI 108 plus noise 110 generated by the receiver's processing chain, as illustrated by power spectrum 106a. A third radio 102c can transmit an interference signal 112 (i.e., a signal not of interest to receiver 102b), which can be overheard by receiver 102b. If there were no other users in the channel, the receiver 102b would see the interference signal 112 plus noise 110 generated by the receiver's processing chain, as illustrated by power spectrum 106c. When radios 102a and 102c both transmit in the same channel, receiver 102b sees the SOI 108, the interference signal 112, and noise 110 generated by the receiver's processing chain, as illustrated by power spectrum 106b. By definition, interference signal 112 occupies the same channel (or "band"), or at least a portion of the same band, at the same time as SOI 108. In some embodiments, first radio 102a and third radio 102c may intentionally transmit in the same channel. In other embodiments, such channel interference may be unintentional.

In the simplified example of FIG. 1, first radio 102a may be referred to as a "radio of interest" from the perspective of second radio 102b. That is, a "radio of interest" refers to a radio that transmits a SOI. In the case of bidirectional communication, two or more radios can be mutual radios of interest in that they each transmit and receive signals of interest. Mutual radios of interest are sometimes referred to as a "user" of a channel. An interferer transmitting in the same band may be considered a separate user ("interference user") of the channel.

In a conventional radio, interference may be treated as unstructured noise, making it difficult if not impossible for the conventional radio to detect a SOI. However, a MUD receiver can allow for successful communication in the same band as an interferer because a MUD receiver can effectively remove interference caused by the interferer and help the receiver "see through" that interference in order to detect the SOI. Thus, in some embodiments, receiver 102b can include a MUD receiver and, more particularly, a SIC MUD receiver. Disclosed embodiments allow for different radios to operate on the same channel at the same time, allowing users to occupy the same spectrum without having to increase the bandwidth allocation. In some embodiments, a transmitter (e.g., node 102a) may intentionally reduce its transmit power in the presence of an interferer (e.g., node 102c) such that a SIC MUD receiver (e.g., node 102b) can more accurately identify and estimate the unwanted interfering signal and subtract off a higher quality estimate of it. That is, the signal-to-interference-plus-noise ratio (SINR) in the channel may be intentionally reduced to benefit a SIC MUD receiver.

Figure 2:
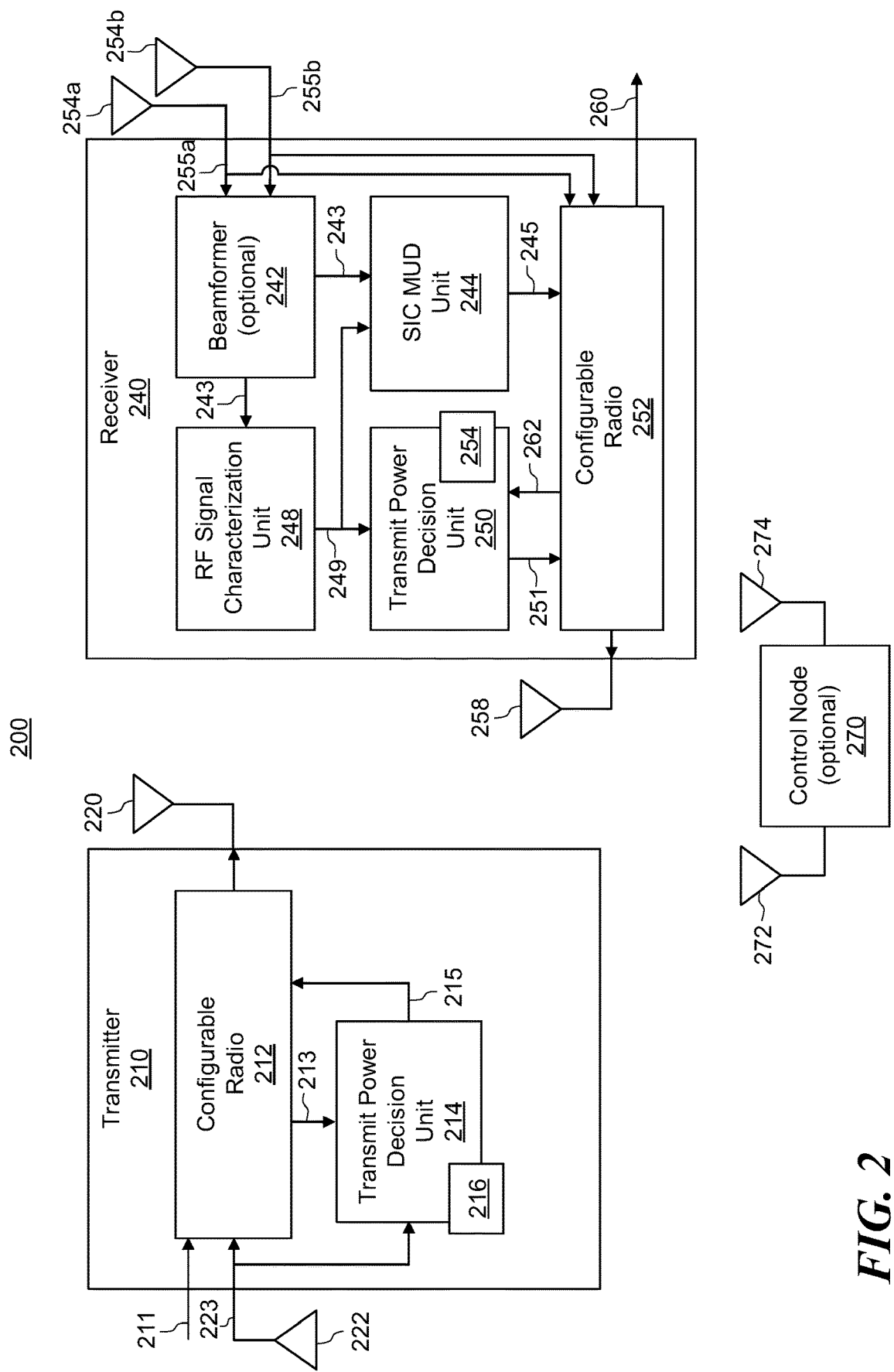
FIG. 2 is a diagram show a system of radios that are able to adjust transmit power, coding rate, and/or modulation level, according to some embodiments.

Turning to FIG. 2, a system of radios 200 can include a transmitter 210, a receiver 240, and an optional control node (or "controller") 270. The transmitter 210 and receiver 240 may be the same as or similar to (e.g., in terms of structure and/or operation) as transmitter 102a and receiver 102b of FIG. 1. That is, transmitter 210 may be configured to transmit a SOI to receiver 240 in a channel having interference users, and receiver 240 can be configured to receive and detect the same.

In the illustrative system 200, transmit power, coding rate, and/or modulation can be adjusted to benefit a SIC MUD receiver. While such adjustments are applied to the transmitter for the benefit of the receiver, the decision to make such adjustments can occur at a transmitter, receiver, or control node. Disclosed embodiments may be used with a system of radios (that may or may not include a controller) that are able to adjust transmit powers (e.g., lower the transmit power), error correction code rates (e.g., adjust from a 9/10 rate code to a ½ rate code), and/or modulation level (e.g. adjust from 16 QAM to QPSK).

While the illustrative transmitter 210 and receiver 240 are shown and described as having certain structural and functional differences, in some embodiments a transmitter and receiver can be substantially identical in terms of structure and/or function. That is, a single radio can embody a disclosed transmitter and a disclosed receiver. Furthermore, a receiver, a transmitter, and/or a receiver-transmitter can act a control node, meaning that it can make decisions and convey instructions to the other radios in the network.

The illustrative transmitter 210 includes a configurable radio 212 and a transmit power decision unit (or "transmit-side decision unit") 214. As used herein, the "unit" refers to a collection of hardware and/or software configured to perform and execute the processes, steps, or other functionality described in conjunction therewith. Transmitter 210 can further include one or more antennas to propagate and/or intercept electromagnetic (EM) waves in its environment. In the example of FIG. 2, transmitter 210 includes a transmit antenna 220 for sending EM waves (e.g., a SOI to be intercepted by a SIC MUD receiver) and a receive antenna 222 for receiving EM waves (e.g., signals propagated by the SIC MUD and/or the control node). In some embodiments, transmitter 210 can include more than two antennas, or only a single antenna. The various components of transmitter 210 can be coupled together as shown in FIG. 2 or in any other suitable manner.

Configurable radio 212 can receive, as input, a digital stream of bits (or "bit stream") on signal path 211. For convenience, a signal carried on a particular signal will be referred to herein using the reference number for the signal path show in the drawings. The input signal 211 may correspond to a SOI to be transmitted, and may comprise frame data or packet data. Configurable radio 212 can include circuitry to up convert the input signal 211 to provide an RF signal to transmit antenna 258 for propagation in the environment.

Configurable radio 212 can also receive, as input, an RF signal 223 detected by receive antenna 222. The RF signal 223 may correspond to one or more of: (a) acknowledgements (ACKs) of successfully received packets sent by a receiver; (b) requests for packets, including requests for new packets and requests for previously sent packets ("repeat packet requests") sent by a receiver; and (c) transmit power control messages sent by the receiver and/or the control node to instruct the transmitter to adjust its power, coding rate, and/or modulation. As will be described in detail below, in some embodiments, transmitter 210 is capable of adjusting its power on its own, without receiving instructions from the receiver or control node. Configurable radio 212 may include circuitry to down convert and process received RF signal 223 to generate a demodulated bit stream, referred to herein as "control data." The control data may be provided to transmit-side decision unit 214 on path 213. Transmit-side decision unit 214 may also directly receive the received RF signal 223 as input (e.g., decision unit 214 can include or otherwise have access to circuitry to estimate or otherwise determine parameters of the RF signal 223). While not shown in FIG. 2, control data 213 may also be provided as an output of the transmitter.

Transmit-side decision unit 214 can use control data 213 and/or parameters of the RF signal 223 to make decisions about the transmit power, coding rate (e.g., error correction code rate), and/or modulation level (e.g., 16 QAM, QPSK, etc.) to use when transmitting a SOI to a receiver.

In some embodiments, transmitter 210 may receive transmit power control messages from a receiver and/or control node that include instructions for adjusting transmit power, coding rate, and/or modulation. In this case, decision unit 214 can simply follow the receiver/controller instructions by sending appropriate control signals 215 to the transmit radio 212. Alternatively, transmit power control messages can be processed directly within transmit radio 210 and transmit-side decision unit 214 may be omitted.

In some embodiments, transmitter 210 can adjust its own power/rate/modulation, without receiving instructions from a receiver or control node. In this case, transmit-side decision unit 214 can indirectly determine one or more quality metrics associated with a link based on feedback information from a receiver. Examples of feedback information that can be used include the frequency or number of ACKs received from a receiver and/or the frequency/number of repeat packets requests, which indicate that the receiver was unable to successfully decode packets. In some embodiments, the transmitter can estimate a packet drop rate at the receiver based on ACKs and repeat packet requests. Decision unit 214 can determine if the link quality is acceptable based on the link quality metrics. For example, decision unit 214 can determine that the link quality is acceptable if the estimated packet drop rate is less than a predetermined maximum packet drop rate. That is, decision unit 214 can determine if the link can be "closed" using the current transmit power, coding rate, and modulation.

If the link quality is unacceptable (e.g., because of unwanted interfering signals in the channel), transmit-side decision unit 214 can perform a series of steps to adjust or reconfigure the transmit radio 212, via line 215, in an attempt to close the link. First, decision unit 214 can instruct the radio 212 to transmit at a lower power. If lowering the transmit power does not result in an acceptable link quality, decision unit 214 can then instruct the radio 212 to decrease the coding rate and/or modulation level. If these changes do not result in an acceptable link quality, decision unit 214 can then instruct the radio 212 to increase transmit power. Thus, in some embodiments, transmit-side decision unit 214 can favor a decrease in transmit power, leading to an intentional decrease in received SINR, over an increase in transmit power. As previously discussed, decreasing received SINR can improve performance at a SIC MUD receiver. In some embodiments, decision unit 214 may include memory or other type of storage 216 for tracking and monitoring information about the link over time. A detailed process that can be implemented within transmit-side decision unit 214 for adjusting transmit power, coding rate, and/or modulation is shown in described in the context of FIG. 3.

The illustrative receiver 240 can include an optional beamformer 242, a SIC MUD unit 244, an RF signal characterization unit (RFSCU) 248, a transmit power decision unit (or "receive-side decision unit") 250, and a configurable radio 252. Receiver 240 can further include one or more antennas to receive and/or propagate electromagnetic (EM) waves in its environment. In the example of FIG. 2, receiver 240 includes receive antennas 254a, 254b, etc. (254 generally) for receiving EM waves (e.g., waves propagated by a radio of interest in addition to waves propagated by an interference radio) and a transmit antenna 258 for sending EM waves (e.g., for sending ACKs, packet requests, transmit power control messages, etc. to a transmitter and/or control node). Receiver 240 can have a different antenna configuration in other embodiments. The various components of receiver 240 can be coupled together as shown in FIG. 2 or in any other suitable manner.

Receive antennas 254 can intercept EM signals and generate one or more received radio frequency (RF) signal and provide the one or more received RF signals 255a, 255b, etc. (255 generally) to beamformer 242 and to configurable radio 252, as shown. Beamformer 242 can receive the one or more RF signals 255 and, in response, generate a beamformed signal 243. Beamformer 242 can be provided as an analog, digital, or hybrid beamformer. The beamformed signal 243 can be provided to RFSCU 248 and SIC MUD unit 244, as shown. In other embodiments, beamformer 242 can be omitted and the received RF signals may be provided directly to RFSCU 248 and/or SIC MUD unit 244.

RFSCU 248 processes the beamformed signal 243 to determine one or more parameters thereof. Such signal parameters may include, for example, a carrier frequency and band that corresponds to a unique transmitted SOI, and one or more of the following parameters associated with the SOI: received signal power, received signal modulation level (e.g. QPSK), error correction coding type, code rate, received signal signature pulse, timing offset relative to reference, received phase offset relative to reference, baud rate and/or symbol duration, channel transfer function and/or multipath characterization of channel. RFSCU 248 may include a radio front end to down convert and process received RF signals. In some embodiments, a sliding filter may be provided as part of front end circuitry to observe the different RF bands one at a time in the RSSCU 248. In some other embodiments, a wideband front end may be used to capture signals within multiple the RF bands at the same time. RFCU 248 can provide the determined signal parameters to receive-side decision unit 250 and to SIC MUD unit 244 via signal path 249.

SIC MUD unit 244 is configured to perform multi-user detection (MUD) on a received RF signal (e.g., an RF signal received from beamformer 242 or directly from one or more receive antennas 254) using sequential interference cancellation (SIC). SIC MUD unit 244 can estimate received signal parameters for an interfering signal, such as received amplitude, carrier frequency, phase, and baud timing. Such parameters can be estimated using signal parameter information received from RFSCU 248 via path 249. The SIC MUD unit 244 can then demodulate the interfering signal, recreate it using the estimated parameters and demodulated symbol weights. Using the estimated signal parameters and demodulated symbols, the SIC MUD receiver can create an estimate of the received interfering signal and subtracts it from the received signal to reveal a SOI underneath. This "cleaned up" received signal 245 can then be passed to a conventional (or "legacy") receiver within configurable radio 252. In some embodiments, SIC MUD unit 244 can be provided as part of a configurable radio.

Configurable radio 252 can include circuitry to receive and demodulate the cleaned up RF signal 245 and, in response, generate a demodulated and decoded bit stream on signal path 260. This output 260 represents decoded bits associated with the transmission from a radio of interest, such as transmitter 210. In some embodiments, radio 252 can output frames or packets sent by a radio of interest. Configurable radio 252 may include a conventional receiver including a radio front end to down convert and process received RF signals. In some embodiments, both RFSCU 248 and configurable radio 252 may use the same front end circuitry. Configurable radio 252 can also include a conventional transmit circuitry to receive digital data (e.g., a bit stream or packets corresponding to control information), perform analog to digital conversion on the digital data to generate an analog signal, up convert analog signal to RF signals and to provide the RF signals to transmit antenna 258 to be propagated as EM signals in the environment. Radio 252 may be provided from technology known to one of ordinary skill in the art of wireless communication systems and MUD receivers.

In some embodiments, radio 252 may be capable of sending transmit power control messages to instruct a transmitter to adjust transmit power, coding rate, and/or modulation. In other embodiments, radio 252 need not be capable of sending such control messages. For example, as previously discussed, a transmitter can decide to adjust its own power/rate/modulation based on ACKs and/or packet requests from the receiver 240.

Receive-side decision unit 250 can decide when and how the transmitter's power, coding rate, and/or modulation level should be adjusted to improve the performance of the SIC MUD receiver 240. Receive-side decision unit 250 can use estimated signal parameters from RFCU 248 to make these decisions. Decision unit 250 may also receive data from radio 252 corresponding to the decoded SOI bit stream via signal path 262. In some embodiments, data 262 may be the same as output data 260. Receive-side decision unit 250 can determine one or more link quality metrics which, in turn, can be used to determine if the link is acceptable.

In some embodiments, decision unit 250 can directly calculate its packet drop rate based on the number of packets successfully decoded at the receiver. In other embodiments, decision unit 250 may not have access to packet drop information because decision unit 250 is logically or physically separate from the portion of the receiver that decodes packets, such as the modem. This may be the case when decision unit 250 and/or SIC MUD unit 244 are implemented within (or "on top of") a legacy/conventional radio system. In this case, the one or more link quality metrics can be computed from the cleaned up signal 245 (i.e., the recovered SOI, prior to demodulation). In particular, decision unit 250 can estimate SNR and modulation rate, and conventional lookup tables can be used to determine if a link can be closed.

If receive-side decision unit 250 determines, based on the link quality metrics, that the link is unacceptable, decision unit 250 can first send a control message instructing the transmitter to decrease its power. Receiver 240 can send such control messages directly to the transmitter or indirectly via a control node. The control messages can be provided to a control unit with radio 252 via line 251. If the link quality does not improve to an acceptable level, decision unit 250 can then send a control message instructing the transmitter to decrease the coding rate and/or modulation level. If none of these changes results in acceptable link quality, unit 250 can then send a control message to instruct the transmitter to increase its power. As previously discussed, in some embodiments, the transmitter can go through these steps without receiving control messages from a receiver.

In some embodiments, decision unit 250 may include memory or other type of storage 254 for tracking link state over time, such as transmit power, coding rate, and modulation level (as instructed by the receiver) and corresponding link performance metrics, such as SNR and packet drop rate. A detailed process that can be implemented within receive-side decision unit 250 for deciding adjustments to transmit power, coding rate, and/or modulation is shown in described in the context of FIG. 4.

In addition to sending power adjustment control messages to the transmitter, receiver 240 can also send ACKs of successfully received packets, and requests for packets including repeat requests for unsuccessfully decoded packets or frames.

In some embodiments, receiver 240 may send transmit power control messages via an optional control node 270. Control node 270 can make decisions and convey instructions to the other radios in the network, such as transmitter 210. Examples of instructions that can be conveyed by control node 270 include instructions to adjust transmit power, coding rate, and/or modulation (e.g., from 8-PSK to QPSK). Receiver 240 may transmit control messages via its transmit antenna 258 and the instructions may be received at control node 270 via a receive antenna 272. The control node may, in turn, transmit instructions to other radios via a transmit antenna 274. In some embodiments, control node 270 may have a wired connection to one or more other in the network radios and may transmit instructions thereupon.

In some embodiments, control node 270 can coordinate transmit power adjustments between multiple users (e.g., between multiple transmitter-receiver pairs). For example, control node 270 can receive transmit power control messages from multiple receivers along with information about each receiver's measured interference SNR and/or SOI SNR. The control node 270 can use this information to make decisions about which control messages should be forwarded to the respective transmitters versus taking some other action. For example, instead of instructing a transmitter to lower its power, control node 270 can decide that it would be beneficial for a transmitter-receiver pair to change frequency or time slots, or take another action such that the SOI interferes with a different signal or signals to improve SIC MUD receiver performance.

Figure 3:
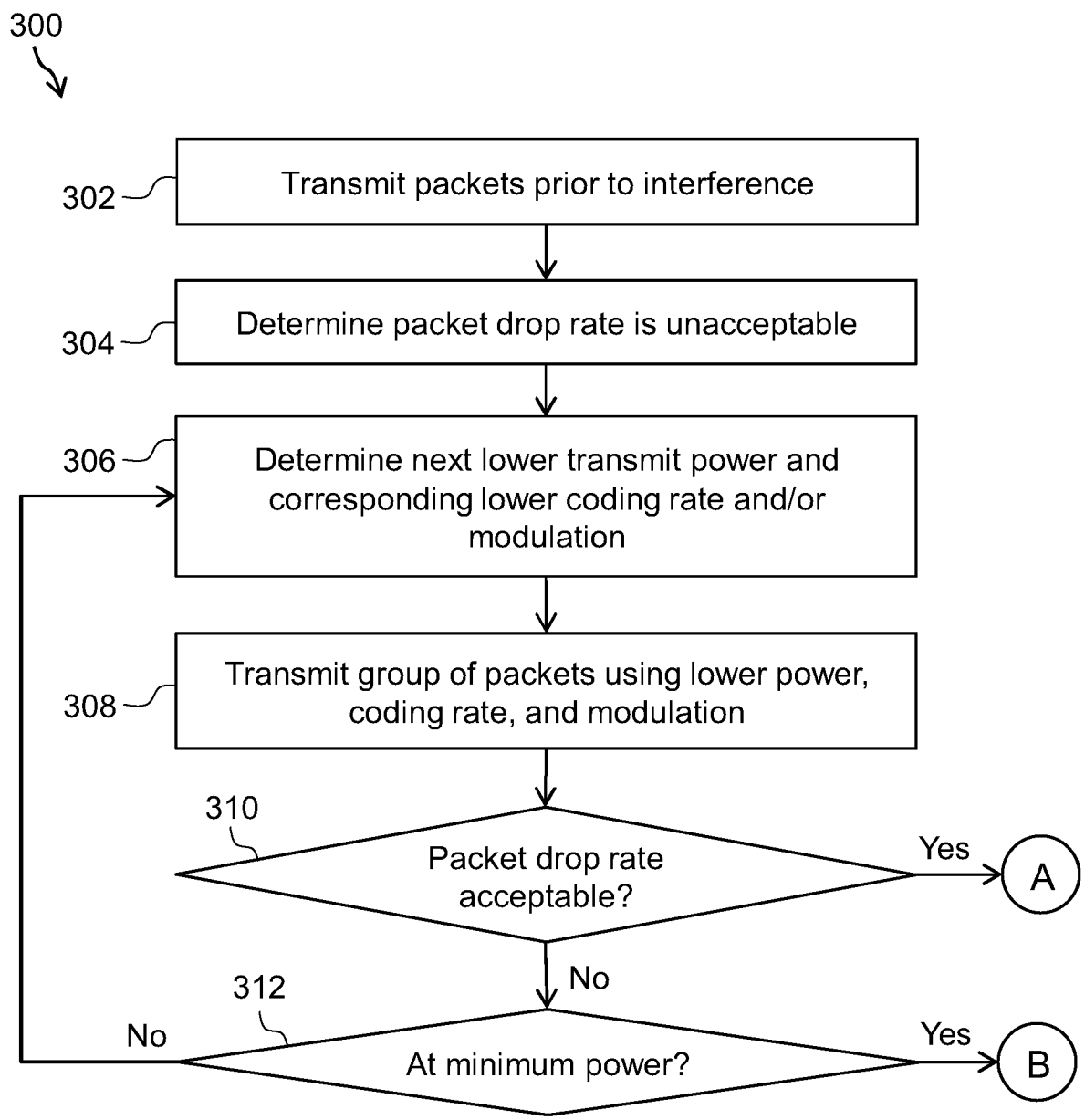
FIG. 3 is a flow diagram showing a process for transmitter-based power adaptation to enhance a sequential interference cancelling (SIC) receiver, according to some embodiments.
Figure 3:
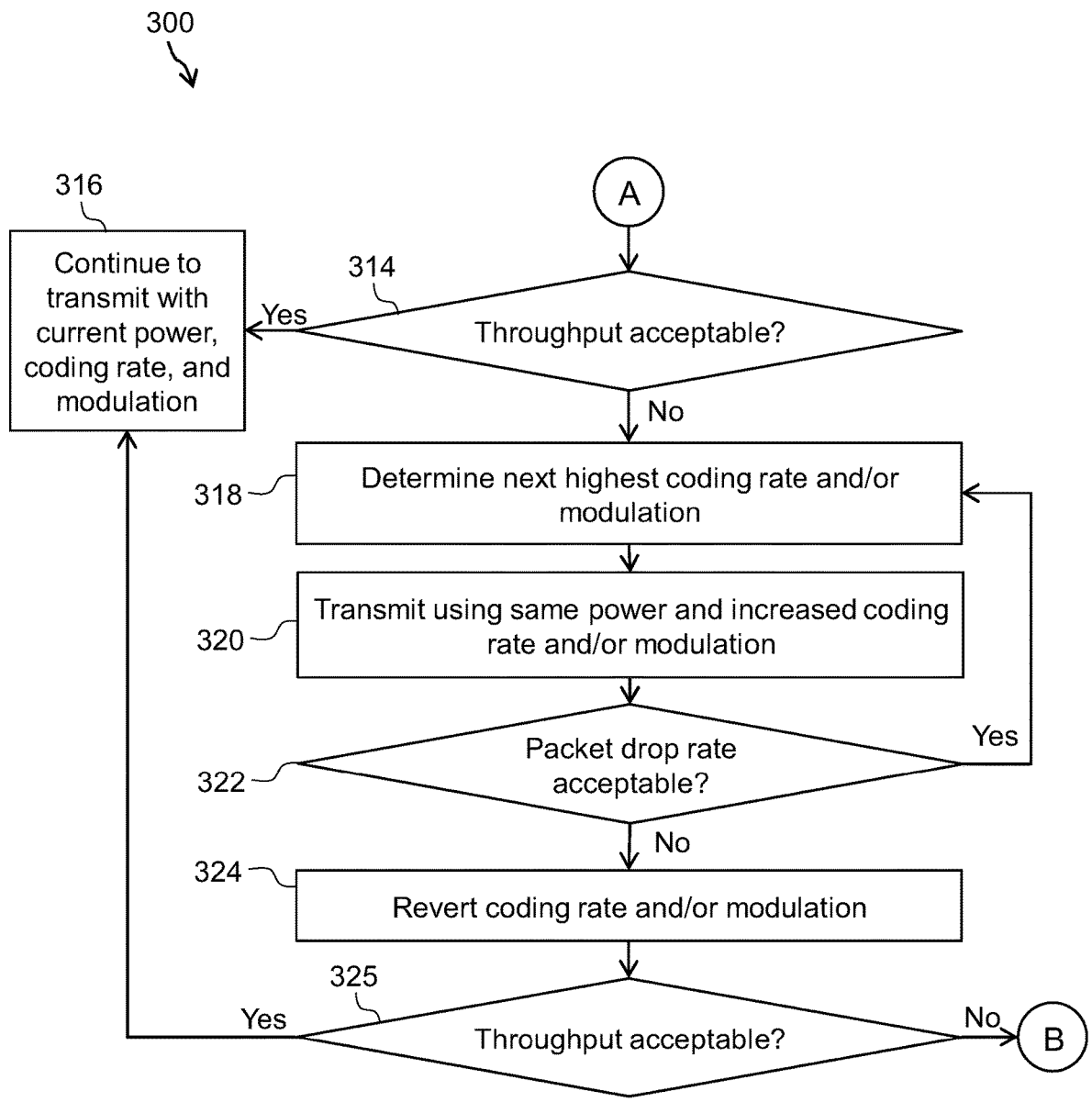
Figure 3:
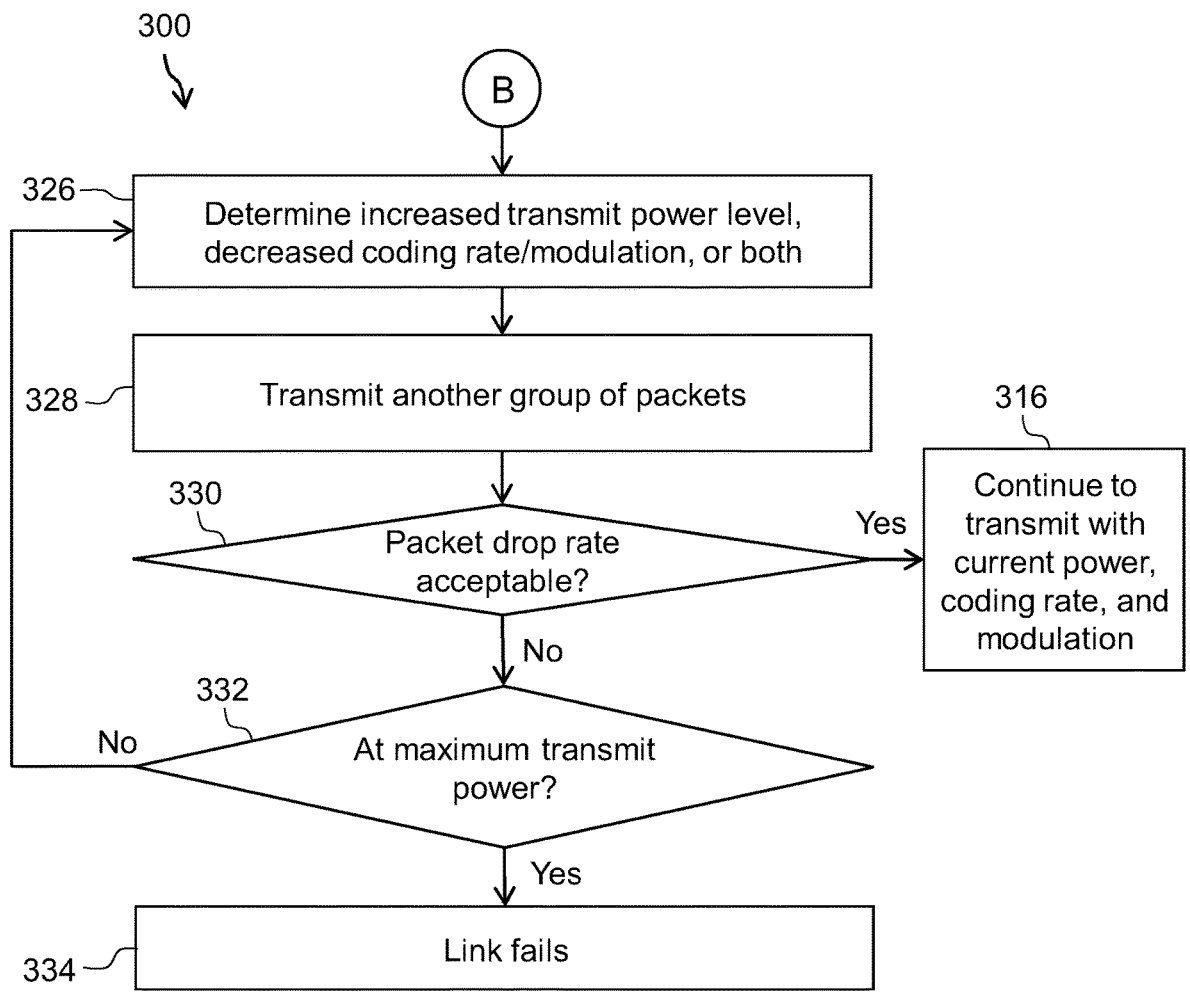

FIG. 3 shows a process 300 for transmitter-based power adaptation to enhance a MUD receiver (e.g., a SIC MUD receiver), according to some embodiments. Illustrative process 300 can be implemented, for example, within transmit-side decision unit 214 of FIG. 2.

At block 302, the transmitter can transmit packets to a receiver on a link prior to interference. Prior to interference, the transmitter and receiver can close the link using some power, coding rate, and modulation level (referred to herein as the "initial" or "original" power/rate/modulation). The initial power/rate/modulation can be determined, for example, as part of an acquisition or handshake process between the transmitter and receiver.

At block 304, the transmitter can determine that the packet drop rate is unacceptable. For example, the transmitter can estimate a packet drop rate at the receiver using feedback information from the receiver, such as ACKs and/or repeat packet requests, as discussed previously. The transmitter can determine that the packet drop rate is unacceptable (i.e., too high) if the packet drop rate is greater than a predetermined maximum packet drop rate. The maximum packet drop rate can be statically defined (e.g., by a user) or determined ahead of time in a dynamic manner according to the needs of a particular application (e.g., based on how tolerant an application is to packet loss). In response to determining the packet drop rate is too high, process 300 can try lowering transmit power, as described next.

At block 306, the transmitter can determine the next lower transmit power and a corresponding lower coding rate and/or modulation. In some embodiments, the transmit power can be decreased by a predetermined increment (e.g., by 0.5 dB, 1 dB, 2 dB, etc.). The coding rate and/or modulation level can be decreased by amounts that correspond the drop in transmit power. When transmit power is reduced, link closure in the absence of any interference is possible only with a lower rate than that which was being used with the higher SNR link prior to the interference causing link disruption. Thus, the rate of the transmitted signal needs to be adjusted down by changing the coding rate and/or modulation level to match the new lower SNR. In some embodiments, the transmitter can estimate the new SNR that will result at the receiver after the transmitter reduces the transmit power but if the interferer were not present. The transmitter can decrease its coding rate and modulation level to match the estimated new interference-free SNR. Lookup tables provided within existing adaptive coding and modulation capable modems can be used to determine a suitable change in coding rate and modulation level (or "order") when moving from one SNR to another. The modulation level can be defined according to a lookup table that orders the code rate and modulation combinations for rate adaptation. It is appreciated herein that even if the estimated new interference-free SNR is incorrect, as may be the case for modems that estimate SNR (or equivalently $E_b/N_0$, energy per bit to noise power spectral density ratio, or $E_s/N_0$, energy per symbol to noise power spectral density), the new interference-free SNR estimate is still useful for determining the relative change in SNR and, thus, the corresponding relative change in coding rate and modulation level that would be needed to close the lower-power link if there were no interference present.

At block 308, the transmitter can transmit a group of packets to the receiver using the lower transmit power, coding rate, and/or modulation. The size of a packet group can be a hardcoded parameter defined by, for example, a modem designer, or an adjustable value that can be overridden by a user of the transmitter.

At block 310, the transmitter can again determine the packet drop rate (e.g., based on ACKs and repeat packet requests from the receiver, as previously discussed). If the packet drop rate is acceptable (e.g., less than the predetermined maximum packet drop rate), then processing can proceed to block 314.

If the packet drop rate is still too high, then at block 312, the transmitter can decide whether it should continue lowering transmit power or whether it should try increasing power instead. For example, the transmitter can compare the current transmit power level against a predetermined minimum power level. In some embodiments, the minimum power level may be specified within a lookup table or other specification provided by the radio designer. If the current power level is above the threshold, then the transmitter can try decreasing power by another increment. That is, process 300 can repeat its "downward" power adaptation strategy at block 306, as shown. If the current power level is at or below the minimum power level, then the transmitter can switch to an "upward" power adaptation strategy at block 326.

It will be appreciated that blocks 306, 308, 310, and 312 incrementally decrease transmit power starting from original power level that successfully closed the link, continuing until the packet drop rate recovers to an acceptable level or a minimum power level is reached. In other embodiments, the transmitter could decide to jump from the original power level to the minimum power level immediately upon detecting packet loss at block 304. It is expected that the packet drop rate would recover when transmitting at this minimum power level. From there, the transmitter can incrementally increase transmit power until the packet drop rate increases too much. At this point, the transmitter can revert to the previous transmit power level (i.e., the power level one increment down), and then the process could proceed from block 314 as shown.

When lowering the transmit power reduces packet loss to an acceptable level, process 300 can next try to incrementally increase coding rate and modulation (while maintaining the same lower power level), if necessary, until an acceptable throughput is achieved, as described next.

At block 314, the transmitter can determine the link throughput, for example by multiplying the coding rate and a modulation rate that resulted from the downward power adaptation procedure. Other techniques for determining the throughput of a link can be used. The transmitter can then determine if the throughput is acceptable by, for example, comparing it to a predetermined minimum throughput value (e.g., a rate below which the link would not be viable for a particular application, user, etc.). The minimum throughput value can be user-defined or determined automatically based, e.g., on the needs of a particular application or environment. If the throughput is acceptable, then the transmitter can continue to transmit with the current power, coding rate, and modulation at block 316. Otherwise, processing can proceed to block 318.

At block 318, the transmitter can determine the next highest coding rate and/or modulation level, e.g., the next highest rate/modulation level specified within modem lookup tables. In some embodiments, the transmitter can consult a lookup table to find the next highest modulation level, and then consult the same table or a different table to find a corresponding code rate specified by the modem designer. At block 320, the transmitter can transmit a group of packets at the increased rate (but without changing the power level).

At block 322, if the packet drop rate is still acceptable while transmitting at the increased rate (e.g., if the packet drop rate remains below the maximum packet drop rate), then the process can repeat from block 318 and try further increasing the link rate, as shown. Otherwise, at block 324, the transmitter can decide that the increased rate was harmful to the link and, thus, the transmitter can revert the coding rate and modulation level to their previous values (e.g., down one level). In some embodiments, the transmitter may include memory or other type of storage in which it can store combinations of power level, coding rate, and modulation level that resulted in a rate-viable link. Among other uses, these stored values can be used to revert the coding rate and modulation level at block 324.

After reverting the coding rate and modulation, the transmitter can again determine if an acceptable throughput has been achieved (block 325). If so, then, at block 316, the transmitter can continue transmitting with the current power level, coding rate, and modulation (i.e., the lowered power level and the reverted coding rate and modulation level). Otherwise, the transmitter may switch the upward power adaptation procedure, at block 326. Thus, if the transmitter has exhausted its attempts to keep power the same but increase the throughput, then it may then try increasing transmit power.

When the transmitter is unable to close a viable-rate link by lowering its power, then the transmitter can next try increasing its power. That is, the transmitter can switch from a "downward" power adaptation strategy to an "upward" power adaptation strategy.

At block 326, the transmitter can decide to either (a) increase transmit power, (b) decrease coding rate and/or modulation level, or (c) both increase transmit power and decrease coding rate and/or modulation. When deciding to increase power, the transmitter can start from the original power level used to successfully close the link prior to interference, and then add a predetermined increment (e.g., 0.5 dB, 1 dB, 2 dB, etc.). When deciding to decrease coding rate or modulation, the transmitter can start from the original rate/modulation used to successfully close the link prior to interference, and then decrease by one level (e.g., using a modem lookup table as previously discussed).

At block 328, the transmitter can transmit a group of packets at the higher transmit power and/or lower coding rate and/or modulation level. At block 330, if the change in power or rate results in an acceptable packet loss, then the transmitter can continue operating at the higher power level (block 316). Otherwise, processing continues at block 332.

At block 332, if the current transmit power is less than a maximum transmit power, then the process can repeat from block 326 by incrementally increasing transmit power and/or incrementally lowing coding rate and/or modulation. The maximum transmit power can be based, for example, on the maximum effective isotopically radiated power (EIRP) of the transmitter. If the transmitter is already operating at full power, then, at block 334, process 300 may determine that a rate-viable link cannot be closed by the combination of transmitter-based power adaptation and MUD (e.g., SIC MUD) processing in the receiver.

As mentioned above, when the packet drop rate is acceptable the transmitter can continue to transmit at the same power, coding rate, and modulation (block 316). In some embodiments, the transmitter may periodically monitor the packet drop rate (or another link quality metric) to determine if further adjustments are necessary. For example, after the transmitter transmits a fixed number of packet groups or transmits for a fixed amount of time, process 300 can repeat from block 304.

In some embodiments, the transmitter may include memory or other type of storage for tracking link state over time, such as transmit power, coding rate, modulation level and corresponding link performance metrics, packet drop rate, and any feedback metrics that might be provided by a controller or the receiver such as SOI received SNR as well as interference metrics such as interference signal received power, modulation type, and frequency band. This stored information can be used to improve or enhance the disclosed power adaptation procedures.

Figure 4:
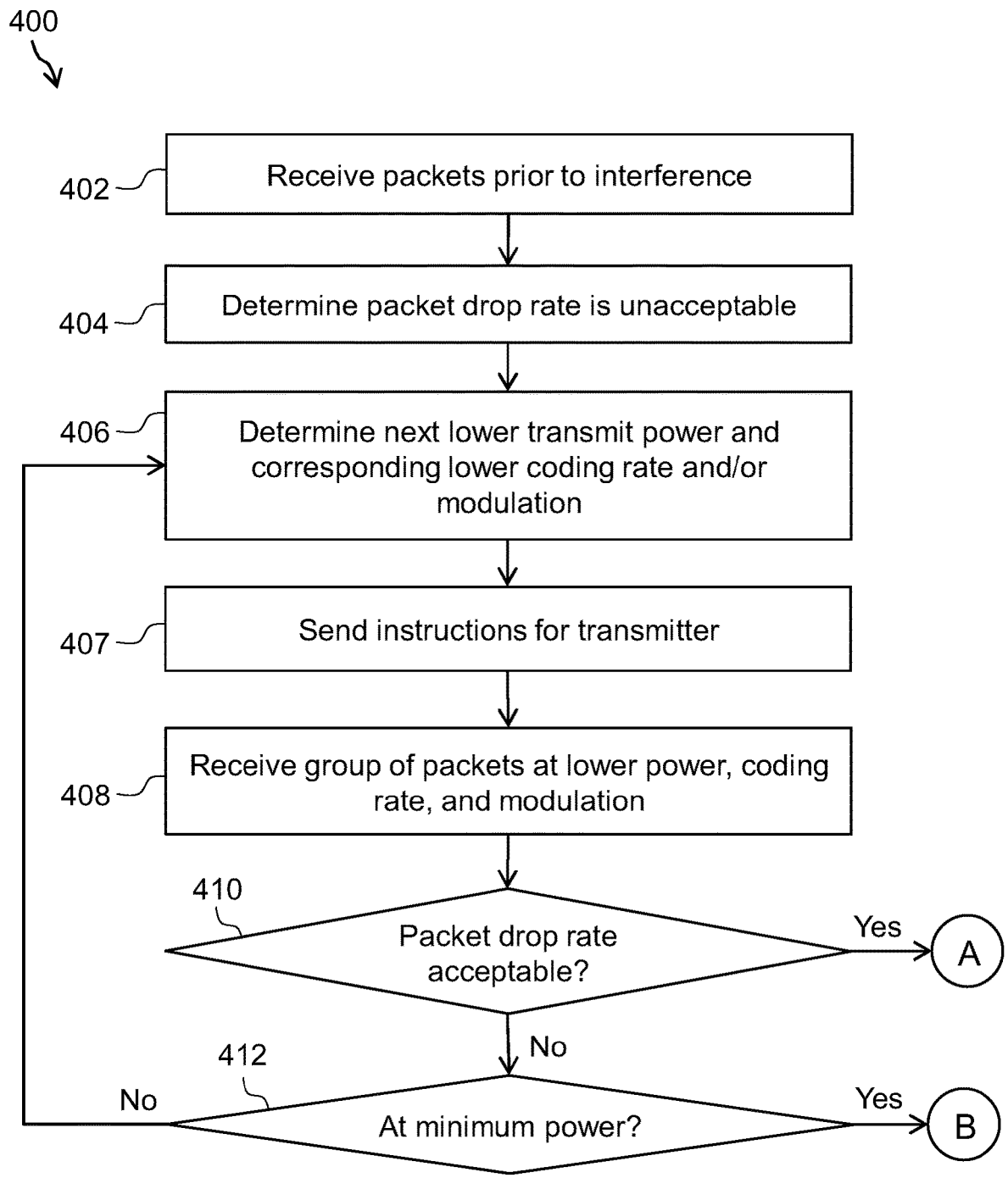
FIG. 4 is a flow diagram showing a process for receiver-based power adaptation to enhance a MUD receiver, according to some embodiments.
Figure 4:
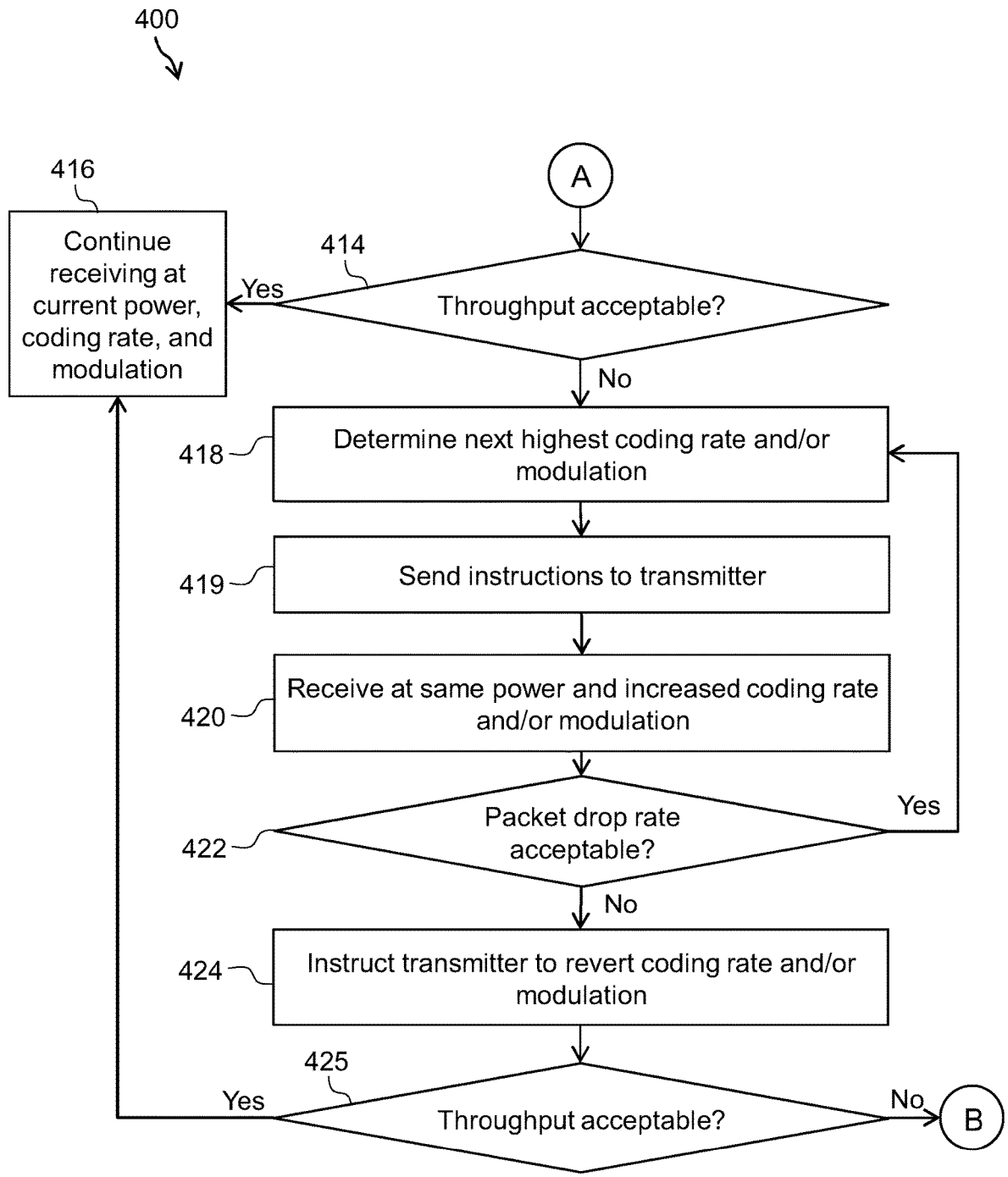
Figure 4:
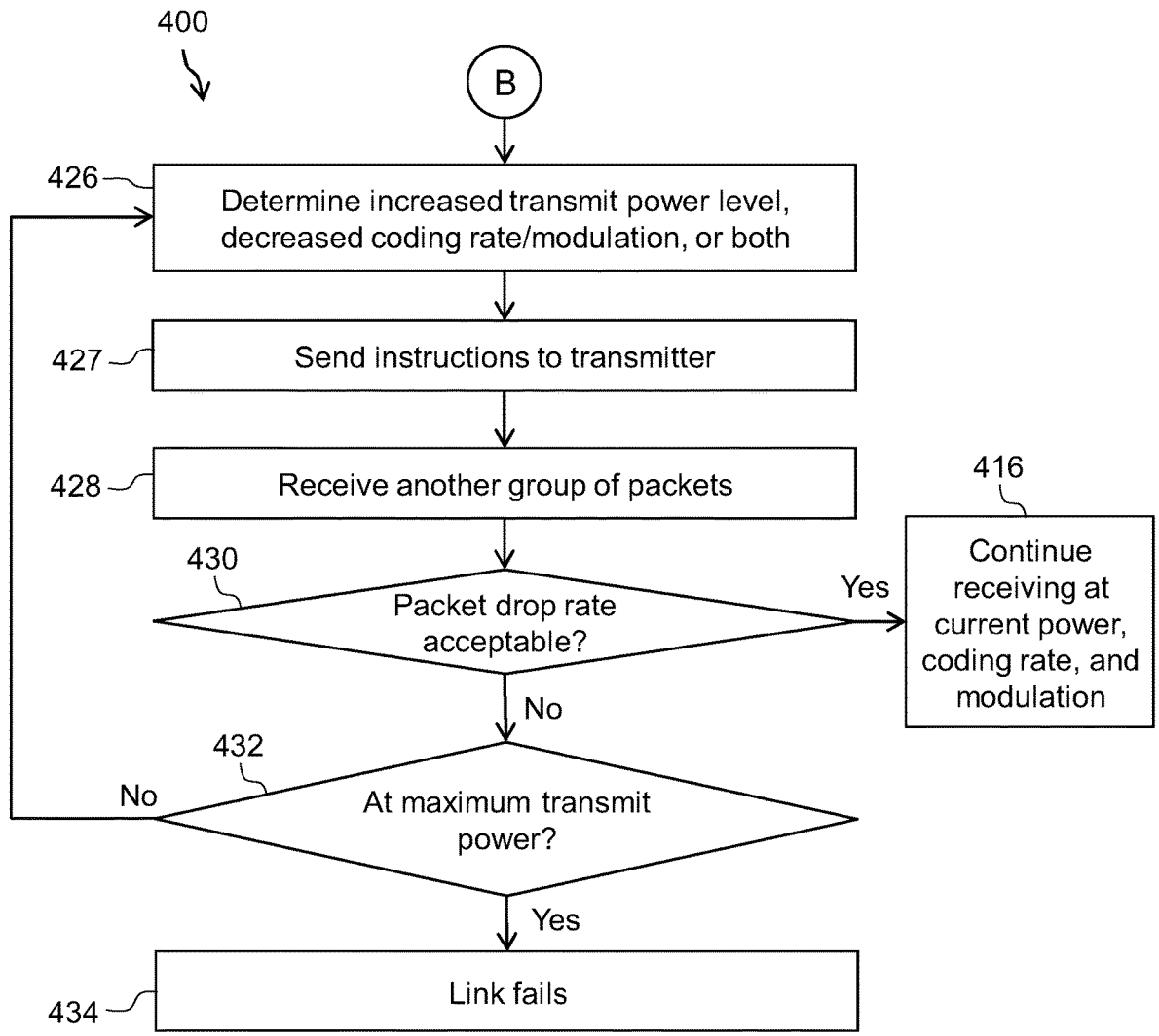

FIG. 4 shows a process 400 for receiver-based power adaptation to enhance a MUD receiver (e.g., a SIC MUD receiver), according to some embodiments. Illustrative process 400 can be implemented, for example, within receive-side decision unit 250 of FIG. 2.

At block 402, the receiver can receive packets from a transmitter on a link prior to interference. Prior to interference, the transmitter and receiver can close the link using some power, coding rate, and modulation level (referred to herein as the "initial" or "original" power/rate/modulation). The initial power/rate/modulation can be determined, for example, as part of an acquisition or handshake process between the transmitter and receiver.

At block 404, the receiver can determine that its packet drop rate is unacceptable. For example, the receiver can directly or indirectly calculate a packet drop rate (as discussed in the context of FIG. 2) and compare the packet drop rate to a predetermined maximum packet drop rate. In response to determining the packet drop rate is too high, process 400 can try lowering transmit power, as described next.

At block 406, the receiver can determine the next lower transmit power and a corresponding lower coding rate and/or modulation. Techniques for lowering transmit power, coding rate, and modulation are described above in the context of FIG. 3.

At block 407, the receiver can send a control message to instruct the transmitter to lower the transmit power, coding rate and/or modulation to the determined amounts. The receiver can send control messages directly to the transmitter or indirectly to the transmitter by way of an optional control node. The control node can make decisions about which transmit power adaptations should be applied to which transmitters, as discussed above with FIG. 2. A control message can specify a relative or absolute change in transmit power, coding rate, and/or modulation level.

At block 408, the receiver can receive a group of packets at the lowered transmit power, coding rate, and/or modulation level. The size of a packet group can be a hardcoded parameter defined by, for example, a modem designer, or an adjustable value that can be overridden by a user.

At block 410, the receiver can again determine its packet drop rate. If the packet drop rate is acceptable, then processing can proceed to block 414.

If the packet drop rate is still too high, then at block 412, the receiver can decide whether it should continue instructing the transmitter to lower its power or whether it should try instructing it to increase its power instead. For example, the receiver can compare the current transmit power level against a predetermined minimum power level. If the current power level is above the threshold, then the receiver can try instructing the transmitter to decrease its power by another increment. That is, process 400 can repeat its "downward" power adaptation strategy at block 406, as shown. If the current power level is at or below the minimum power level, then the receiver can switch to an "upward" power adaptation strategy at block 426.

It will be appreciated that blocks 406, 408, 410, and 412 incrementally decrease transmit power starting from original power level that successfully closed the link, continuing until the packet drop rate recovers to an acceptable level or a minimum power level is reached. In other embodiments, the receiver could decide to jump from the original power level to the minimum power level immediately upon detecting packet loss, using a similar strategy as described above in the context of transmitter-side process 300 of FIG. 3.

When lowering the transmit power reduces packet loss to an acceptable level, process 400 can next try instructing the transmitter to incremental increase coding rate and modulation (while maintaining the same lower power level), if necessary, until an acceptable throughput is achieved, as described next.

At block 414, the receiver can directly determine the link throughput based on received data, by multiplying the coding rate and a modulation rate that resulted from the downward power adaptation procedure, or using another technique. The receiver can then determine if the throughput is acceptable by, for example, comparing it to a predetermined minimum throughput value (e.g., a rate below which the link would not be viable for a particular application, user, etc.). If the throughput is acceptable, then the receiver can continue to receive packets at the current power, coding rate, and modulation at block 416. Otherwise, processing can proceed to block 418.

At block 418, the receiver can determine the next highest coding rate and/or modulation level, e.g., using techniques described above in the context of FIG. 3. At block 419, the receiver can send a control message to instruct the transmitter to increase its coding rate and/or modulation level while keeping its power level the same. At block 420, the receiver can receiver another group of packets at the increased rate.

At block 422, if the packet drop rate is still acceptable while transmitting at the increased rate (e.g., if the packet drop rate remains below the maximum packet drop rate), then process can repeat from block 418 and try further increasing the link rate, as shown. Otherwise, at block 424, the receiver can decide that the increased rate was harmful to the link and, thus, the receiver can instruct the transmitter to revert the coding rate and/or modulation level to their previous values (e.g., down one level). In some embodiments, the receiver may include memory or other type of storage in which it can store combinations of power level, coding rate, and modulation level that resulted in a rate-viable link. Among other uses, these stored values can be used to revert the coding rate and modulation level at block 424.

After reverting the coding rate and modulation, the receiver can again determine if an acceptable throughput has been achieved (block 425). If so, then, at block 416, the receiver can continue receiving packets at the current power level, coding rate, and modulation (i.e., the lowered power level and the reverted coding rate and modulation level). Otherwise, the receiver may switch the upward power adaptation procedure, at block 426.

At block 426, the receiver can decide to either (a) increase transmit power, (b) decrease coding rate and/or modulation level, or (c) both increase transmit power and decrease coding rate and/or modulation. When deciding to increase power, the receiver can start from the original power level used to successfully close the link prior to interference, and then add a predetermined increment (e.g., 0.5 dB, 1 dB, 2 dB, etc.). When deciding to decrease coding rate or modulation, the receiver can start from the original rate/modulation used to successfully close the link prior to interference, and then decrease by one level (e.g., using a modem lookup table as previously discussed). At block 427, the receiver can send a control message to instruct the transmitter to change its transmit power, coding rate, and/or modulation level accordingly.

At block 428, the receiver can receiver a group of packets at the higher transmit power and/or lower coding rate and/or modulation level. At block 430, if the change in power or rate results in an acceptable packet loss, then the receiver can continue receiving packets at the higher power level (block 416). Otherwise, processing continues at block 432.

At block 432, if the current transmit power is less than a maximum transmit power, then the process can repeat from block 426 by incrementally increasing transmit power and/or incrementally lowering coding rate and/or modulation. The maximum transmit power can be based, for example, on the maximum effective isotopically radiated power (EIRP) of the transmitter. If the transmitter is already operating at full power, then, at block 434, process 400 may determine that a rate-viable link cannot be closed by the combination of transmitter-based power adaptation and MUD (e.g., SIC MUD) processing.

As previously discussed, process 400 can be used within various types of MUD-enabled receivers. In the case of a SIC MUD-enabled receiver, process 400 may be include an extra step of disabling the SIC MUD processing unit before switching to the upward" power adaptation procedure (i.e., before block 426). It is appreciated that when a SIC MUD receiver has high packet loss, increasing transmit power will generally cause packet loss to increases, making the link worse. Thus, disabling the SIC MUD before increasing transmit power may provide better results. If the receiver is equipped with other MUD's, such as an optimal joint MUD or an M-algorithm reduced state optimal joint MUD, those other MUD's may be enabled during the upward power adaptation as their performance may improve as the SOI's received power increases and may require less of a SOI transmit power increase to succeed than a traditional receiver would need.

In some embodiments, the receiver may include memory or other type of storage for tracking link state over time, such as transmit power, coding rate, modulation level and corresponding link performance metrics, such as SNR and packet drop rate. This stored information can be used to improve or enhance the disclosed power adaptation procedures.

Various other methods and procedures can be used to adjust transmit power to benefit a SIC MUD receiver. For example, in some embodiments, in response to detecting an inadequate link quality, transmit power can be decreased to the lowest possible level supported by the transmitter, and then incrementally increased until the link is closed. If an acceptable rate is achieved, the transmitter can be instructed to continue transmitting at that power lever. Alternatively, the method can proceed to incrementally increase transmit power until the link is lost, and then return to the last power level before the link was lost. It is appreciated herein that various different transmit power adaptation methods can be implemented within a single radio, and the radio can try multiple methods or select a particular method based on the parameters and characteristics of a particular SOI and of the interfering signals. Moreover, a given transmit power adaptation method (or set of methods) can be executed multiple times for a given link, as changes in interference power or modulation can cause the SOI link to get dropped or provide an opportunity to improve the link quality. For example, it may be possible to increase SOI throughput when interference power changes since the "right" power level for the SOI link is dependent upon the received interference-free SNR and the SIC's ability to estimate and accurately recreate the interfering signal in the presence of the SOI.

Embodiments described herein may be used advantageously in at least the following exemplary commercial settings.

Example 1: Co-channel interference-tolerable cognitive radio spectrum licensing. The FCC could allocate spectrum for adapt-only and smart-adapting (e.g. cognitive) radios. As radio frequency (RF) spectrum tends toward being completely occupied, the radios in each band are allowed and encouraged to "work out", on the fly, jointly agreeable situations in which interference is tolerated and useful communication continues. There is no requirement for radios to adhere to the same specification or be built to "talk with" one another to bring about the feasible co-existence. This is also no requirement for a controller that can "talk" to all systems that wish to use this band to help work out the terms co-existence.

Example 2: LTE-Advanced. The current critical need is to have self-deployed, self-configurable, loosely-controlled networks that are backward compatible with existing LTE systems. LTE-advanced will allow individuals to stand up their own LTE femto-cell without the need for a centralized provider. This can lead to many problems if done incorrectly, so non-provider deployed LTE networks need to be self-configuring. Also, the spectrum is already suffering from being too full.

Example 3: Embodiments also allow an increased number of users in cellular systems. This technology allows lower power femto-cells to coexist on channels in use by macro-cells, servicing additional user by more densely using resources already owned by cellular network operators. Deployment in handsets, that do not have the physical size or weight to support more than two antennas, would allow for higher frequency reuse due to automatic mitigation of interference, and enhances the performance that would be possible using only two antenna elements in a traditional manner, such as adaptive beamforming alone. This technology also enables service in stadiums and other venues in which there are thousands of users in close proximity. This technology does not require a large antenna array, unlike other technologies.

Example 4: Home networking. The density of home wireless technologies may be increased through application of radios that automatically co-exist with legacy equipment. This is particularly useful in dormitories and apartment buildings where many different WiFi access points exist in close proximity.

Disclosed embodiments may be implemented in any of a variety of different forms. For example, disclosed embodiments can be implemented within various forms of communication devices, both wired and wireless, such as television sets, set top boxes, audio/video devices, smartphones, laptop computers, desktop computers, tablet computers, satellite communicators, cameras having communication capability, network interface cards (NICs) and other network interface structures, base stations, access points, and modems.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for mitigating interference in a channel having multiple users, the method comprising:
    transmitting, by a transmitter, a signal of interest (SOI) to a sequential interference cancellation (SIC) receiver at a transmit power;
    determining, by the transmitter, a packet drop rate at the receiver; and
    decreasing the transmit power in response to determining the packet drop rate is greater than a predetermined maximum packet drop rate.

2. The method of claim 1, comprising:
incrementally decreasing the transmit power until the packet drop rate is less than the predetermined maximum packet drop rate.

3. The method of claim 1, wherein determining the packet drop rate at the receiver comprises:
estimating, by the transmitter, the packet drop rate based on acknowledgements (ACKs) of successfully received packets or repeat packet requests sent by the receiver.

4. The method of claim 1, wherein decreasing the transmit power comprises:
receiving a control message from the receiver instructing the transmitter to decrease the transmit power.

5. The method of claim 1, wherein transmitting the SOI comprises transmitting the SOI at a coding rate and a modulation level, the method comprising:
decreasing the coding rate and the modulation level based on the decrease in transmit power.

6. The method of claim 5, comprising:
after decreasing the transmit power, determining, by the transmitter, an updated packet drop rate at the receiver; and
in response to determining the updated packet drop rate is less than the predetermined maximum packet drop rate, increasing the coding rate and the modulation level while keeping the transmit power the same.

7. The method of claim 5, comprising:
after decreasing the transmit power, determining, by the transmitter, an updated packet drop rate at the receiver; and
in response to determining the updated packet drop rate is greater than the predetermined maximum packet drop rate, increasing the transmit power.

8. The method of claim 1, wherein transmitting the SOI comprises transmitting the SOI at a coding rate and a modulation level, the method comprising:
after decreasing the transmit power:
determining, by the transmitter, a first updated packet drop rate at the receiver, and
in response to determining the first updated packet drop rate is less than the predetermined maximum packet drop rate, increasing the coding rate and the modulation level; and
after increasing the coding rate and the modulation level:
determining, by the transmitter, a second updated packet drop rate at the receiver, and
in response to determining the second updated packet drop rate is less than the predetermined maximum packet drop rate, further increasing the coding rate and the modulation level.

9. A method of mitigating communication interference, the method comprising:
(a) transmitting, by a transmitter to a sequential interference cancellation (SIC) receiver, a signal of interest (SOI), the transmitter transmitting at a current transmit power;
(b) determining, by the transmitter, a packet drop rate at the SIC receiver;
(c) decreasing, by the transmitter, the current transmit power if the determined packet drop rate at the SIC receiver is greater than a predetermined maximum packet drop rate; and
repeating steps (a) to (c).

10. The method of claim 9, wherein step (c) comprises: decreasing the current transmit power by a predetermined increment value.

11. The method of claim 9, wherein determining the packet drop rate at the SIC receiver comprises:
determining, by the transmitter, the packet drop rate based on received acknowledgements (ACKs) of successfully received packets or repeat packet requests sent by the SIC receiver.

12. The method of claim 9, comprising:
further decreasing, by the transmitter, the current transmit power in response to a control message from the SIC receiver.

13. The method of claim 9, wherein the SOI is transmitted at a current coding rate and a current modulation level, and wherein step (a) further comprises:
setting the current coding rate and the current modulation level based on the decrease in the current transmit power.

14. The method of claim 13, wherein step (c) further comprises:
increasing the current coding rate and the current modulation level, while keeping the current transmit power the same, if the determined packet drop rate is less than the predetermined maximum packet drop rate.

15. The method of claim 14, further comprising:
reverting the current coding rate and the current modulation level if, after increasing them, the determined packet drop rate is greater than the predetermined maximum packet drop rate.

16. The method of claim 14, further comprising:
increasing the current transmit power if, after decreasing the transmit power to a minimum power, the packet drop rate is greater than the predetermined maximum packet drop rate.

17. A method of mitigating communication interference, the method comprising:
(a) transmitting, by a transmitter to a sequential interference cancellation (SIC) receiver, a signal of interest (SOI) comprising a plurality of packets, at a current transmit power, a current coding rate, and a current modulation level;
(b) determining, by the transmitter, a packet drop rate at the SIC receiver;
(c) decreasing, by the transmitter, the current transmit power if the determined packet drop rate is greater than a predetermined maximum packet drop rate and changing at least one of the current coding rate and the current modulation level by an amount corresponding to the decrease in the current transmit power; and
repeating steps (a) to (c).

18. The method of claim 17, wherein step (c) further comprises:
decreasing the current transmit power by a predetermined increment value.

19. The method of claim 17, wherein determining the packet drop rate further comprises:
determining, by the transmitter, the packet drop rate based on received acknowledgements (ACKs) of successfully received packets or repeat packet requests sent by the SIC receiver.

20. The method of claim 17, wherein the transmitter decreases the current transmit power as a function of a control message from the SIC receiver.

21. The method of claim 17, wherein step (c) further comprises:
increasing the current coding rate and the current modulation level, while keeping the current transmit power the same, if the determined packet drop rate is less than the predetermined maximum packet drop rate.

22. A method of mitigating communication interference between a transmitter and a sequential interference cancellation (SIC) receiver, the method comprising:

(a) transmitting, by the transmitter to the SIC receiver, a signal of interest (SOI), the SOI comprising a plurality of packets, the transmitter transmitting the SOI at a current transmit power, a current coding rate, and a current modulation level;

(b) determining, by the transmitter, a packet drop rate at the SIC receiver;

(c) in response to the packet drop rate being greater than a predetermined maximum packet drop rate, decreasing the current transmit power and changing at least one of the current coding rate and the current modulation level by an amount corresponding to the decrease in the current power;

(d) transmitting, by the transmitter to the SIC receiver, the SOI at the decreased current transmit power and the changed at least one of the current coding rate and the current modulation level;

(e) repeating (b) to (d) until the packet drop rate is less than the predetermined maximum packet drop rate;

(f) determining, by the transmitter, a throughput between the transmitter and the SIC receiver;

(g) in response to the throughput being less than a predetermined minimum throughput value, increasing at least one of the current coding rate and the current modulation level;

(h) transmitting, by the transmitter to the SIC receiver, the SOI at the increased coding rate or modulation level; and (i) repeating (f) to (h) until the throughput is greater than the predetermined minimum throughput value.

* * * * *